Sept. 11, 1934. W. A. BRUSH 1,973,139
FISHING FLY
Filed April 16, 1931
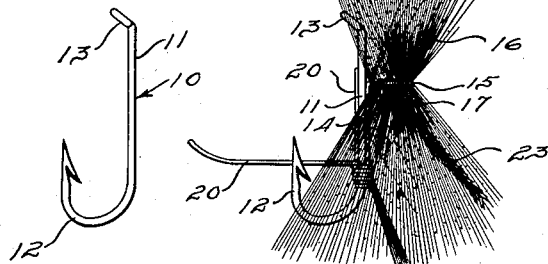
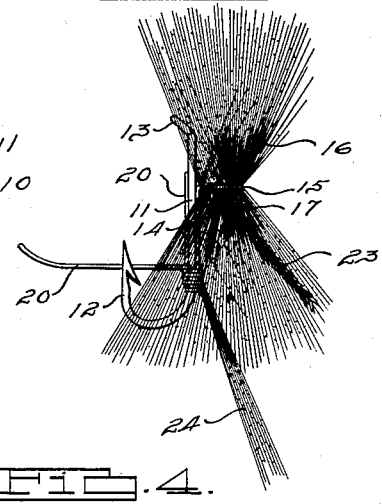
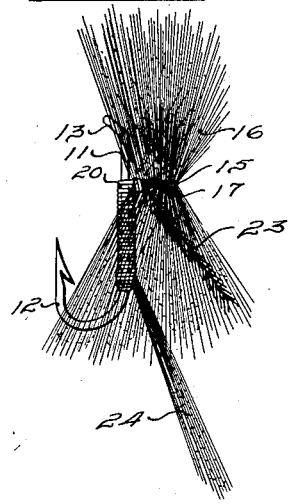
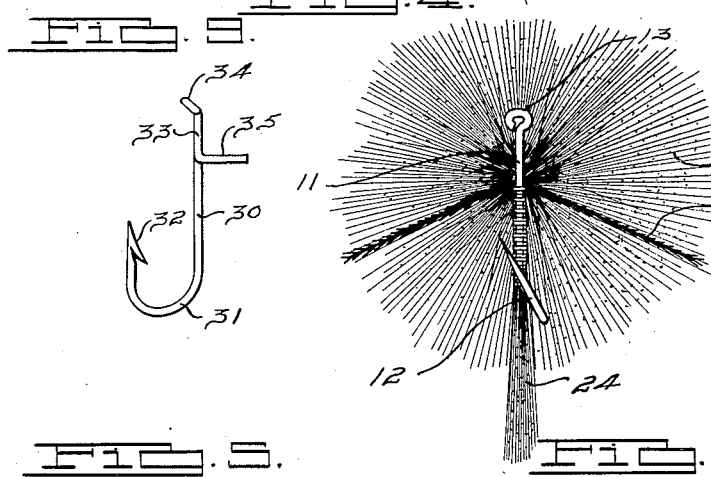
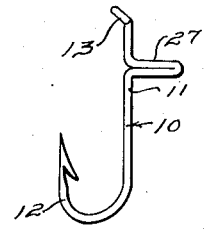
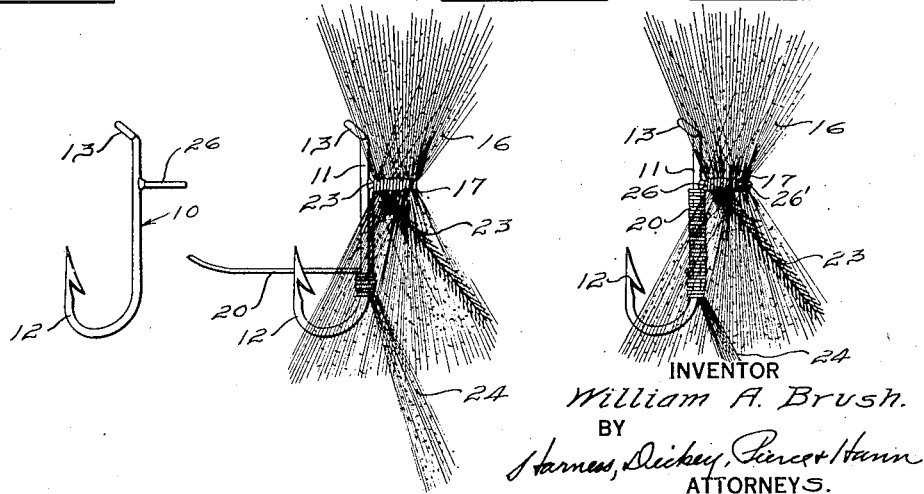
INVENTOR
William A. Brush.
BY
Bakewell, Dickey, Pierce & Hann
ATTORNEYS.

Patented Sept. 11, 1934

1,973,139

UNITED STATES PATENT OFFICE 1,973,139

FISHING FLY

William A. Brush, Detroit, Mich.

Application April 16, 1931, Serial No. 530,614

15 Claims. (Cl. 43—48)

This invention relates to artificial flies for angling purposes, and particularly to that type thereof known as dry flies. The principal objects of the invention are to provide a device of this character which will more nearly simulate a live fly or bug, as the case may be, than artificial flies used previously; to provide an artificial fly, in which the hackle is so related to the hook that when the latter is in its properly suspended position, the position of the fly will closely correspond to the position that a live fly would have on the water; to provide an artificial fly in which the hackle is so arranged, that the hook will be guided to a more desirable suspended position in the water; to provide an artificial fly, in which the eye on the hook, when such type of hook is employed, will be arranged in a more natural manner with respect to the hackle, and since the eye simulates the head of a live fly, that the eye and hackle will have more of a natural appearance; to provide an improved form of metal hook to which a hackle may be secured; and to provide an artificial fly which will resist immersion in the water to a greater degree than artificial flies employed previously.

Artificial flies for angling purposes, ordinarily are constructed by winding the quill part of the hackle along the straight shank portion of the metal hook, and fastening it thereto by means of a silk thread. The hackle itself ordinarily projects outwardly in a direction normal to the quill portion, and therefore in a direction radial with respect to the shank portion of the hook. Thus the hackle is approximately balanced on all sides of the hook so that when a fly of this character is cast, there is no particular tendency for it to land in the desired position on the water. In fact, with the greater number of type of artificial flies, it is only a relatively small proportion of the number of times that the fly is cast that it alights on the water with the shank thereof parallel to the surface of the water and the barb of the hook in its lowermost position relative to the shank, this being the position generally desired. Furthermore, in view of the fact that the hackle, in conventional constructions, extends radially of the shank of the hook, should the fly alight on the water with its shank parallel to the surface of the water, the surface tension of the water in resisting the weight of the fly through the hackle, will prevent rotation of the hook about the axis of its shank so that the point of the hook may move to its relatively lowermost position in the water, which is that desired. These positions of the artificial fly are in contrast to the position a live fly would assume in alighting upon the water, because the body of the latter would assume a position substantially parallel to the surface of the water, and its tail which is simulated by the barb end of the hook, would be turned down into the water.

The present invention contemplates an artificial fly of the class described in which the greatest proportion of the hackle, or an equivalent thereof, is positioned in offset relation with respect to the shank of the hook, so that when the fly is falling toward the water the shank portion of the hook, because of its weight, will naturally tend to assume a position under such offset hackle, and will alight on the water in such position. The barb of the hook will thus be guided into the water in the position desired, whether it be directly below the shank as in conventional constructions, or otherwise.

It is also preferable, both for guiding the fall of the hook in its proper position and for the purpose of better supporting the fly upon the water, that the spread of the hackle be parallel to the shank of the hook. I have found that this may be most easily accomplished by winding the hackle helically or spirally about an axis, and securing to the hook with such axis preferably normal to the shank of the hook. Incidentally, this formation and positioning of the hackle, in appearance, follows that of a number of insects attractive to fish.

Perhaps the easiest and most efficient way of forming and positioning the hackle on a fish hook in the above described manner is to form on or secure to the shank of the hook a projection preferably radially disposed relative to the shank, and then wind the hackle about such projection.

According to one form of this invention, a projection is formed on the shank of the hook, and projects away from the latter in a direction preferably substantially normal thereto and on the side thereof opposite the barb. The spread of the hackle which is then wound on the projection extends substantially normal to the projection and in a plane approximately parallel to the shank of the hook. Then, when the hook is falling toward the water, the hackle constitutes a guiding means, which urges the metallic hook to fall upon the water in such manner that the shank is parallel to the surface of the water and the point of the hook is below it. For angling purposes, especially trout fishing, a hook suspended in this manner on the surface of the water, by means of the hackle, is most desirable, because the fish coming up through the water, takes the fly with the latter in such a position that the hook will be disposed transversely of the mouth of the fish. Moreover, the curved hook portion at the end of the shank, simulates the end portions of the bodies of many flies, which are curved downwardly.

Also in an artificial fly such as above described, the hackle is mainly, although not necessarily entirely, disposed above the shank of the hook, and therefore the hook has a relatively clean underside, or one substantially free from hackle. Hence the fly closely simulates a live fly on the water because the latter usually has a clean under body surface.

For a better understanding of the invention, reference may be had to the accompanying drawing forming a part of this specification, wherein:

Fig. 1 is an elevational view of a conventional type of fish hook before a hackle is secured thereto;

Fig. 2 illustrates the hook shown in Fig. 1, and the manner of securing the hackle to it;

Fig. 3 illustrates the construction shown by Fig. 2, after the hackle has finally been secured to the hook, or in other words this figure illustrates a completed artificial fly constructed according to one form of the invention;

Fig. 4 is a view of the construction shown by Fig. 3, taken from the under side thereof;

Fig. 5 illustrates a slightly different form of metal hook which may be used;

Fig. 6 illustrates the manner of securing the hackle to the hook shown by Fig. 5;

Fig. 7 illustrates the construction shown by Fig. 6, after the hackle has finally been secured to the hook;

Fig. 8 illustrates another form of metal hook which may be used.

Fig. 9 illustrates still another form of metal hook which may be used.

Referring to Fig. 1, a metal hook 10 is provided, having a straight shank portion 11, a hook portion 12 and an eye 13 which extends from the shank portion at an angle thereto. It might be here noted that any conventional type of hook may be employed in connection with the present invention, whether it be the type provided with an integral eye, or not, an eye being shown on the hooks in the drawing merely by way of illustration and because most hooks are so provided. In manufacturing an artificial fly under the present invention according to the construction shown by Figures 1 to 3 inclusive, a portion of the quill of a suitable feather is secured to the shank 11 of the hook 10 and is bent outwardly at one end, as indicated at 15, to provide a portion projecting substantially at right angles to the shank portion and in a direction opposite to that in which the hook portion 12 projects from the shank portion. The quill 14 may be secured to the shank 11, by wrapping a silk thread 20 around the shank and the portion of the quill in contact therewith.

It may be noted here that in the drawing the outwardly bent end 15 of the quill is shown as projecting outwardly from the hook a distance considerably greater than will normally be the case in actual practice. This feature has been exaggerated in the drawing in connection with the various figures, in order to more clearly bring out the salient features of the invention.

The hackle in the construction is illustrated at 16, and is secured in this instance to the portion 15 of the quill 14 projecting from the shank 11 of the hook. It should be understood that the hackle 16 is ordinarily formed from a feather of suitable character, in which the part projecting from the quill, is separated into thread like projections. If found preferable, the entire feather need not be used, but only one half of it, and the latter may be used, either by splitting the quill longitudinally of its length, or by removing the tough outer skin of the quill to which the material at that side of the feather is secured. As shown best by Fig. 2, the quill part of the hackle 16, indicated at 17, is wound helically or spirally around the projecting portion 15 of the quill 14, and its ends may be secured in any suitable manner as, for example, by knotting them about the projecting portion 15. As shown by Fig. 3, the silk thread may also be wound around a portion of the projecting portion 15 of the quill 14 and utilized for securing the quill 17 in position. Small, narrow feathers 23, disposed in diverging relation to the shank 11 of the hook, as shown by Fig. 4, may optionally be secured to the shank of the hook or to the projecting portion 15 of the quill 14, for the purpose of providing elements which simulate the wings of a live fly, and likewise, feathers, hackle, thread, or any other conventional material may optionally be secured or wound about the shank of the hook as in conventional construction. The ends of the feathers 23 may be secured to the projecting portion 15 of the quill 14 by means of the silk thread 20, or they may be secured thereto by the quill 17 of the hackle 16, as it is wound spirally around the projecting portion 15 of the quill 14. A tail 24 may also optionally be secured to the shank portion 11 of the hook 10, by the silk thread 20, and may comprise suitable feather or other elements as in conventional constructions.

While the element 14 has been defined as a quill, it should be apparent that other elements of suitable character also may be employed. Moreover, if a quill is used, a portion of the hackle thereon may be retained to provide the tail 24, or other portions of the hackle may be utilized as found most desirable. It is desired principally to position the hackle 16 in offset relation with respect to the shank portion 11 of the hook, with the separated thread-like elements thereof radiating from the projecting portion 15, disposed on the side of the hook opposite the hook portion 12, from which it follows that the spread of the hackle will extend in a more or less parallel relation to the shank portion 11 of the hook.

When an artificial fly of the character, as shown by Fig. 3, is used, the hackle 16 serves as a guide during the fall of the hook toward the surface of the water, and tends to keep the shank portion 11 of the hook in a horizontal and lowermost position during its movement toward the water, accordingly, when the hook touches the water, the shank will be positioned horizontally with the hook portion 12 immersed in the water, while the hackle 16 floats upon the surface of the water and supports the hook. The eye 13 of the hook, when this type of hook is used, simulates the head of a live fly, while the hook portion 12 simulates to a certain extent, the curved end body portion of certain flies. When the hook is so positioned upon the water, it is apparent that the hackle 16, wings 23, tail 24, and eye 13, closely resemble corresponding parts of a live fly, and are in positions corresponding to the positions that the corresponding parts of a live fly would assume if the latter alighted upon the surface of the water. Moreover, the hook portion will be so disposed that the point will extend horizontally, and in certain forms of fishing, this is especially desirable, particularly when the fish attack the fly from a point immediately below it. As a matter of interest it might be here noted that when the hook is left bare except for the hackle wound about the projection on the shank thereof, a bait is provided which closely simulates a spider floating on the water, and this has proven a very effective lure.

Another feature of the present invention is that by its use a dry fly is provided that will resist sinking better than flies of conventional construction. This is for the reason that such flies float by reason of the surface tension of the water resisting the weight of the fly through contact with the hackle, and in the present case the hackle, most of which extends in a direction parallel to the surface of the water, affords a greater area of contact between the fly and the water than in conventional constructions.

In the construction shown by Figures 5, 6 and 7, the hook 10 is provided with a metal projection 26 which may be secured thereto in any suitable manner as, for example, by soldering, brazing, welding, or tying, or it may be forged thereon. The hackle 16 as shown by Fig. 6, may be secured to this metal projection 26, in substantially the same manner that the hackle is secured to the projection 15 shown by Figs. 2 and 3. Also, the tail 24 and wings 23 when used may be secured to the hook 10 by a silk thread in substantially the same manner as the tail and wings are secured to the hook in the construction shown by these figures. It might be noted here that with this construction, if the hackle is not wound clear to the extreme free end of the projection 26, after the hackle has been wound in place such end may be reversely bent upon the hackle, as at 26' in Fig. 7 to aid in holding the latter in place. Where this is desired, the projection 26 is preferably made of a relatively soft metal, like copper.

In the metal hook shown by Fig. 8, instead of using a metal projection welded or otherwise secured to the shank of the hook as is provided in the construction shown by Fig. 5, the shank is reversely bent, as indicated at 27, to provide a projecting portion. Parts of the reversely bent portion 27, preferably contact one with another and may be soldered together if such reinforcement is necessary or desirable.

In Fig. 9 another way of forming the projection on a hook is illustrated. The particular hook shown in this figure is, with the exception of the projection, of a type now found on the market and comprises a main shank portion 30, a curved end portion 31 including the barb 32, and a reversely bent end portion 33 lying in contact with the portion 30 except at the extreme forward end where it is spread to form an eye 34. In accordance with the present invention the free end portion of the portion 33 is bent away from the shank of the hook to provide the projection 35 which serves the same purpose as the projections described in connection with the previous figures.

In the artificial fly as illustrated and described according to this invention, it is apparent that the hackle so guides the falling of the hook toward the water, that when the fly finally touches and floats upon the water by means of the hackle, the several parts of the fly are in positions similar to the positions that corresponding parts of a live fly would assume in alighting upon the water. Thus the fly on the water more closely resembles a live fly and, therefore, for angling purposes it is more deceptive to fish than artificial flies heretofore employed. Moreover, the positions of the hackle relative to the metal hook is such that the fly will strongly resist immersion and therefore will not sink as quickly, when thrown upon the water, as will artificial flies of conventional constructions, and will float for a much greater period of time.

Although only certain forms of the invention have been described and illustrated in detail, it will be apparent to those skilled in the art that various modifications may be made without departing from the scope of the appended claims.

I claim:

1. An artificial fly including a hook, and a helically wound hackle secured thereto in generally radially offset relation with respect to the shank of the hook.

2. An artificial fly including a metal fish hook, and a helically wound hackle secured to said hook mainly on one side thereof and with the axis of said helix angularly disposed with respect to the shank of the hook.

3. An artificial fly comprising a metal hook having a shank portion and a hook portion, a lateral projection on said shank portion, and a hackle wound around said projection, with the latter as the center of the winding.

4. An artificial fly including a metal hook having a shank portion and a hook portion, a member secured to said shank portion and extending away therefrom, and a hackle wound about said member and projecting therefrom approximately in a plane parallel to said shank portion.

5. An artificial fly including a fish hook, members simulating insects wings secured thereto, a lateral projection on the shank of said hook, and a hackle secured to said projection.

6. An artificial fly including a metal hook having a shank portion and a hook portion, and a quill secured to the shank portion, a portion of said quill projecting away from the shank portion and a hackle wound on said projecting quill portion and extending therefrom in a plane approximately parallel to said shank portion.

7. An artificial fly including a metal fish hook, a metallic projection on the shank of said hook, and a hackle wound about said projection, the free end of said projection being reversely bent as an aid in retaining said hackle thereon.

8. An artificial fly comprising a metal hook having a shank portion and a hook portion, a quill member secured to the hook and projecting away from the shank portion thereof, and a hackle operatively secured to such projecting portion of the quill member.

9. An artificial fly comprising a metal hook having a shank portion and a hook portion, a quill member secured to the hook and projecting away from the shank portion on the side thereof opposite the hook portion, and a hackle operatively secured to such projecting portion of the quill member.

10. An artificial fly comprising a metal hook having a substantially straight shank portion and a hook portion, a quill member secured to the hook and projecting away from the substantially straight portion of the shank and in an approximately radial direction with respect thereto, and a hackle operatively secured to the projecting portion of the quill member.

11. An artificial fly including a metal fish hook having a shank portion and a hook portion, a quill member extending away from said shank portion in a direction approximately radial thereto and on the side of said shank portion opposite the hook portion, a hackle secured to said projecting portion of the quill member and wing members secured to the hook.

12. An artificial fly including a hook, and means comprising a mass of filamentaceous flotation material secured to the shank of the hook in offset relation with respect thereto and on the side thereof opposite the hook portion, said material being adapted to guide the hook during falling thereof toward the water surface, and to substantially support the hook on the surface of the water with the shank thereof substantially parallel to said surface and with the hook portion submerged in the water.

13. An artificial fly comprising a fish hook having a shank portion and a hook portion, and a hackle operatively secured to the shank, and having thread-like, elongated projections generally on that side of the shank opposite the hook portion and extending laterally from the plane of the shank and hook portions, and also longitudinally of the shank, to provide a relatively light flotation material, such material only causing said fly to be so aerodynamically balanced, that as the fly is thrown through the air and after it alights upon the water, the material acts as a suspension means for the hook and maintains the hook portion lowermost.

14. An artificial fly comprising a fish hook having a shank and a hook portion at one end of the shank, a mass of filamentaceous and thread-like flotation material radiating laterally and upwardly in a spreading manner from a point adjacent the other end of the shank, and means operatively securing the center of the mass to the shank, the material only causing the fly to be so aerodynamically balanced that the hook is suspended from the material during the flight of the fly through the air and is supported directly by the material with the hook portion lowermost, when the fly is on the water.

15. An artificial fly comprising a fish hook having a hook portion, and a mass of relatively light filamentaceous material secured to the hook, said material only causing the fly to be so aerodynamically balanced and arranged that the material acts as a suspension means when the fly is falling toward the water and maintains the hook portion lowermost, whereby the hook portion is lowermost when the fly reaches the surface of the water.

WILLIAM A. BRUSH.